(12) United States Patent
Ambrose et al.

(10) Patent No.: US 7,280,170 B2
(45) Date of Patent: Oct. 9, 2007

(54) OPTICAL FILM, LIGHT-DIFFUSING FILM, AND METHODS OF MAKING AND USING THE SAME

(75) Inventors: Nickey Ambrose, Mt. Vernon, IN (US); Grant Hay, Evansville, IN (US); Eugene David Herrmann, Clifton Park, NY (US); Karkala Arun Kumar, Evansville, IN (US); Philip Matthew Peters, Mt. Vernon, IN (US); Joe Riello, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 10/895,787

(22) Filed: Jul. 20, 2004

(65) Prior Publication Data

US 2005/0275764 A1    Dec. 15, 2005

Related U.S. Application Data

(63) Continuation-in-part of application No. 10/852,916, filed on May 25, 2004, now abandoned.

(51) Int. Cl.
*G02F 1/1335* (2006.01)

(52) U.S. Cl. .................... 349/62; 349/64; 362/355

(58) Field of Classification Search .......... 349/62, 349/64, 65, 57, 95, 96, 112, 117, 187; 362/355, 362/606, 608, 615
See application file for complete search history.

(56) References Cited

U.S. PATENT DOCUMENTS

| | | | |
|---|---|---|---|
| 3,005,236 A | 10/1961 | Reichle et al. | |
| 5,944,405 A | 8/1999 | Takeuchi et al. | |
| 5,965,655 A | 10/1999 | Mordecai et al. | |
| 6,194,497 B1 | 2/2001 | Willems et al. | ............. 524/165 |
| 6,222,003 B1 | 4/2001 | Hosoi et al. | |
| RE38,530 E | 6/2004 | Willems et al. | |
| 6,963,451 B2 * | 11/2005 | Se et al. | ..................... 359/599 |
| 2003/0002153 A1 | 1/2003 | Hiraishi et al. | |

(Continued)

FOREIGN PATENT DOCUMENTS

EP    1089114 A2    4/2001

(Continued)

OTHER PUBLICATIONS

U.S. Appl. No. 10/787,158, filed Feb. 27, 2004, Kevin Capaldo et al., "Diffuser for Flat Panel Display", 49 pages.

(Continued)

*Primary Examiner*—Thoi V. Duong
(74) *Attorney, Agent, or Firm*—Cantor Colburn LLP (57) ABSTRACT

A method of making an optical film comprises heating the optical film comprising greater than or equal to 80 wt. % polycarbonate to a sufficient temperature to stretch the optical film, wherein the weight percent is based on a total weight of the optical film; and stretching the optical film, wherein a resulting stretched optical film has a linear CTE measured in a direction parallel to a stretching direction of less than or equal to $50 \times 10^{-6}$ cm/cm/° C.

23 Claims, 5 Drawing Sheets

U.S. PATENT DOCUMENTS

| | | |
|---|---|---|
| 2003/0071947 A1 | 4/2003 | Shiraogawa et al. |
| 2003/0108710 A1 | 6/2003 | Coyle et al. ............... 428/64.4 |
| 2003/0156238 A1 | 8/2003 | Hiraishi et al. |
| 2003/0207082 A1 | 11/2003 | Maas et al. |
| 2003/0214728 A1 | 11/2003 | Olczak ....................... 359/707 |
| 2004/0066645 A1 | 4/2004 | Graf et al. .................... 362/31 |
| 2004/0160673 A1 | 8/2004 | Se et al. |
| 2004/0228141 A1 | 11/2004 | Hay et al. |

FOREIGN PATENT DOCUMENTS

| | | |
|---|---|---|
| EP | 1329746 A1 | 7/2003 |
| JP | 2000-231015 | 8/2000 |
| JP | 2004-58497 | 2/2004 |

OTHER PUBLICATIONS

JP 01204721; Aug. 17, 1989; Manufacture of Thin Polycarbonate Resin Film; English Abstract; only one page.

JP 2004-058497; Feb. 26, 2004; Method for Producing Phase Difference Film; English Abstract; only one page.

JP 2000-231015; Aug. 22, 2000; Production of Phase Difference Plate; English Abstract; only one pate.

JP 04084107; Mar. 17, 1992; Production of Phase Difference Film; English Abstract; only one page.

European Search Report; International Application No. PCT/US2005/015563; Applicant's File Reference 08CS143802-2; International Filing Date May 4, 2005; Date of Mailing Sep. 1, 2005.

* cited by examiner

OPTICAL FILM, LIGHT-DIFFUSING FILM, AND METHODS OF MAKING AND USING THE SAME

CROSS REFERENCE TO RELATED APPLICATIONS

The present application is a continuation-in-part of U.S. patent application Ser. No. 10/852,916, filed on May 25, 2004 now abandoned, which is herein incorporated by reference in its entirety.

BACKGROUND

In backlight computer displays or other display systems, optical film (which may also be referred to as a sheet, layer, foil and the like) materials are commonly used, for example, to direct, diffuse, or polarize light. For example, in backlight displays, brightness enhancement films (BEFs) use prismatic structures on the surfaces thereof to direct light along a viewing axis (i.e., an axis normal (perpendicular) to the display). This enhances the brightness of the light viewed by the user of the display and allows the system to consume less power in creating a desired level of on-axis illumination. Such films may also be used in a wide range of other optical designs, such as in projection displays, traffic signals, and illuminated signs.

In current displays systems, for example in liquid crystal displays (LCD), it is desirable to have light-diffusing films. Light-diffusing films describe a broad class of articles that are used within LCD backlight systems to evenly distribute light to the viewer and hide potential defects generated by a light guide, while maintaining total transmission of light. In addition to these light management properties, these diffusing films need to satisfy certain properties related to their visual appearance in a backlight display system. In particular, these films should lay flat on other films in the system. Generally, when polycarbonate films are used in this application, their high coefficient of thermal expansion may cause portions of the film near the hot lamp to expand while film further from the lamp either does not expand or does not expand to a similar extent, resulting in waviness of these portions of the film, making the entire film unsuitable for use in a backlight display system.

What is needed in the art is a light-diffusing polycarbonate film that minimizes or does not result in observable waviness under the heat of a lamp in backlight system.

SUMMARY

Disclosed herein are optical films, e.g., light-diffusing films, methods of making optical films, and liquid crystal display devices employing optical films.

One embodiment of a method of making an optical film comprises heating the optical film comprising greater than or equal to 80 wt. % polycarbonate to a sufficient temperature to stretch the optical film, wherein the weight percent is based on a total weight of the optical film; and stretching the optical film, wherein a resulting stretched optical film has a linear CTE measured in a direction parallel to a stretching direction of less than or equal to $50 \times 10^{-6}$ cm/cm/° C.

One embodiment of a liquid crystal display device comprises an optical source; a light guide in optical communication with the light source; and a optical film comprising polycarbonate in optical communication with the light guide, wherein the optical film has a linear CTE, measured in a direction parallel to a stretching direction of the optical film, of less than or equal to $50 \times 10^{-6}$ cm/cm/° C.

One embodiment of an optical film comprises greater than or equal to 80 wt. % polycarbonate, wherein weight percent is based on a total weight of the optical film, and wherein the optical film has a linear CTE, measured in a direction parallel to a stretching direction of the optical film, of less than or equal to $50 \times 10^{-6}$ cm/cm/° C.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Disclosed herein are optical films, more particularly light-diffusing films (which may also be referred to as a "diffusers") comprising polycarbonate, wherein the light-diffusing films are capable of being employed in a liquid crystal display device (e.g., a backlight display device) without resulting in waviness of the light-diffusing film as a result of heat from an optical (light) source (e.g., a florescent lamp). Furthermore, it is noted that the optical films, more particularly the light-diffusing films are desirably unitary or monolithic films characterized by the absence of coatings. While it is noted that reference is made to a light-diffusing film throughout this disclosure, this reference is made merely for convenience in discussion and it is to be understood that the discussion is equally applicable to other types of optical films. The term "total" in relation to reflection is used herein to refer to the combined reflectance of all light from a surface. It is noted that the terms "bottom" and "top" are used herein, unless otherwise noted, merely for convenience of description, and are not limited to any one position or spatial orientation. The term "about" as used herein refers to values within ±10% of the specified value.

It should further be noted that the terms "first," "second," and the like herein do not denote any order, quantity, or importance, but rather are used to distinguish one element from another, and the terms "a" and "an" herein do not denote a limitation of quantity, but rather denote the presence of at least one of the referenced item. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %," etc.).

Several embodiments of backlight display devices are discussed hereunder with reference to individual drawing figures. One of skill in the art will easily recognize that many of the components of each of the embodiments are similar or identical to the others. Each of these elements is introduced in the discussion of FIG. 1, but is not repeated for each embodiment. Rather, distinct structure is discussed relative to each figure/embodiment.

Figure 1:
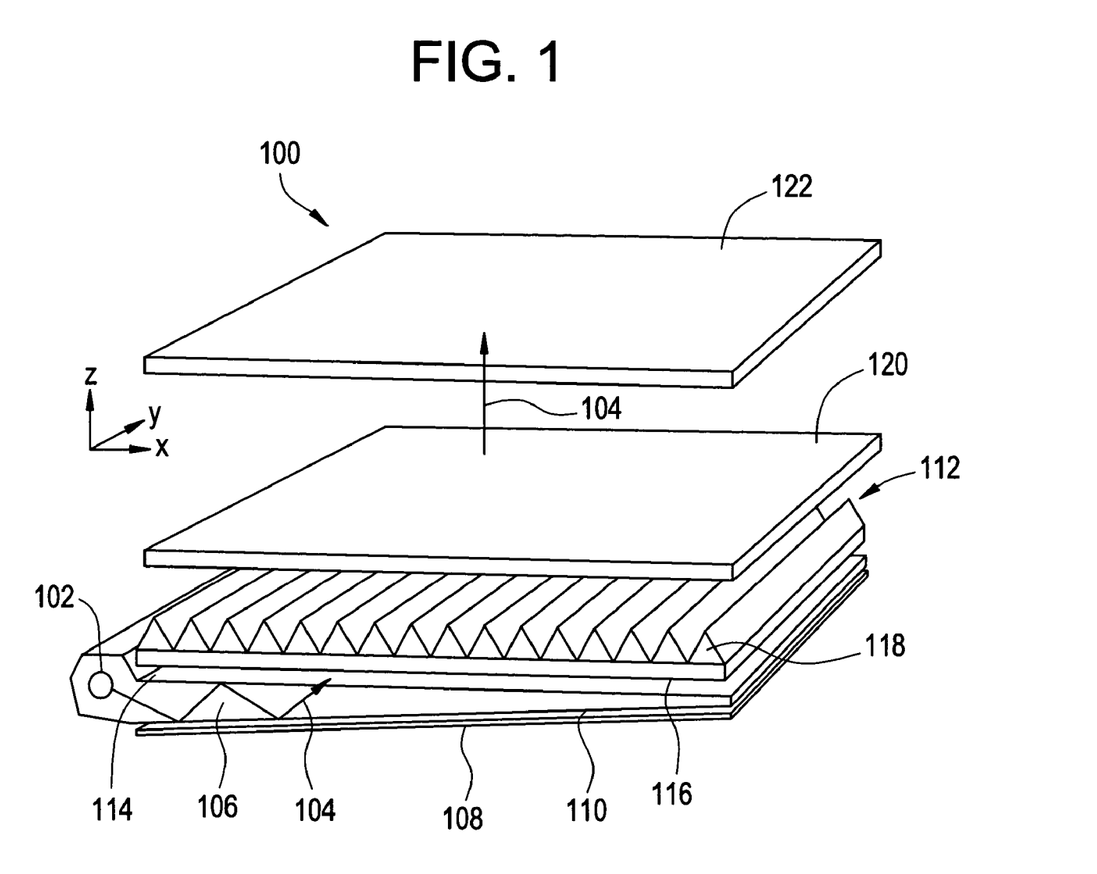
FIG. 1 is a perspective view of an exemplary embodiment of a backlight display device including a light-diffusing film.

Referring now to FIG. 1, a perspective view of a backlight display device generally designated 100 is illustrated. The backlight display device 100 comprises an optical source 102 for generating light 104. A light guide 106 in optical communication with optical source 102 guides the light 104 by total internal reflection (TIR) of the light 104 within the light guide 106. A reflective film 108 in physical and/or optical communication with a first surface 110 of light guide 106 reflects the light 104 out of the light guide 106. A brightness enhancement film (BEF) 112 located in physical and/or optical communication with a second surface 114 of light guide 106 is receptive of the light 104 from the light guide 106.

Figure 2:
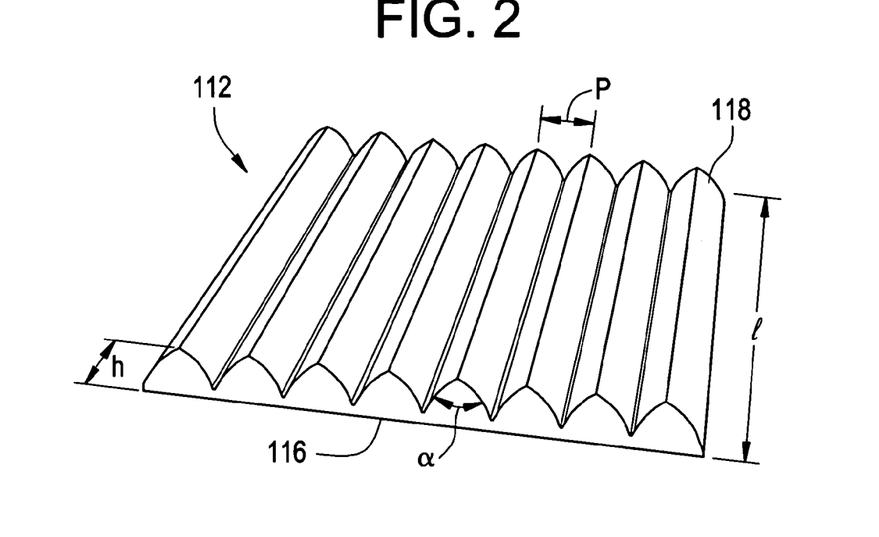
FIG. 2 is a perspective view of an exemplary embodiment of a brightness enhancement film with prismatic surfaces.
Figure 3:
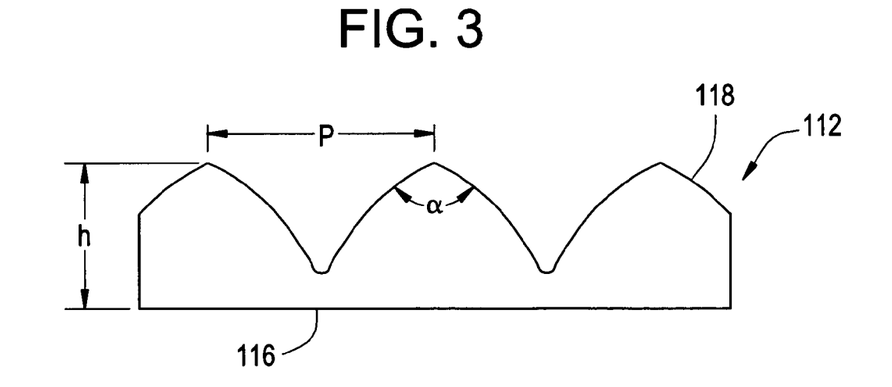
FIG. 3 is a cross-sectional view of another exemplary embodiment of a brightness enhancement film with prismatic surfaces.

More particularly, the BEF 112 comprises a planar surface 116 in physical and/or optical communication with the second surface 114 of light guide 106, and a prismatic surface 118 in physical and/or optical communication with a light-diffusing film 120. Still further, it will be appreciated that the prismatic surfaces 118 may have a peak angle, α, a height, h, a pitch, p, and a length, l (see FIGS. 2 and 3). These parameters of peak angle, α, a height, h, a pitch, p, and a length, l, may have prescribed values or may have values that are randomized or at least psuedo-randomized. Films with prismatic surfaces with randomized or pseudo-randomized parameters are described for example in U.S. patent application Ser. No. 10/150,958 to Olcazk filed on May 20, 2002.

Figure 4:
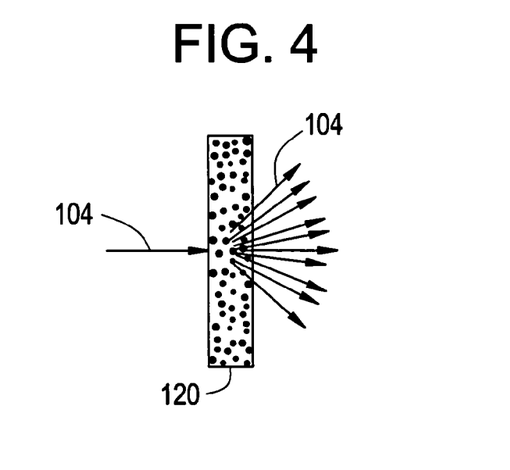
FIG. 4 is a cross-sectional view and schematic illustration of an exemplary embodiment of a light-diffusing film receptive of light and diffusing the light emanating therefrom.

The BEF 112 is receptive of the light 104 and acts to direct the light 104 in a direction that is substantially normal to the BEF 112 as indicated schematically by an arrow representing the light 104 being directed in a z-direction shown in FIG. 1. The light-diffusing film 120 is receptive of the light 104 from the BEF 112 and diffuses (e.g., scatters) the light as illustrated schematically in FIG. 4. The light 104 proceeds from the light-diffusing film 120 to a liquid crystal display (LCD) 122.

Figure 5:
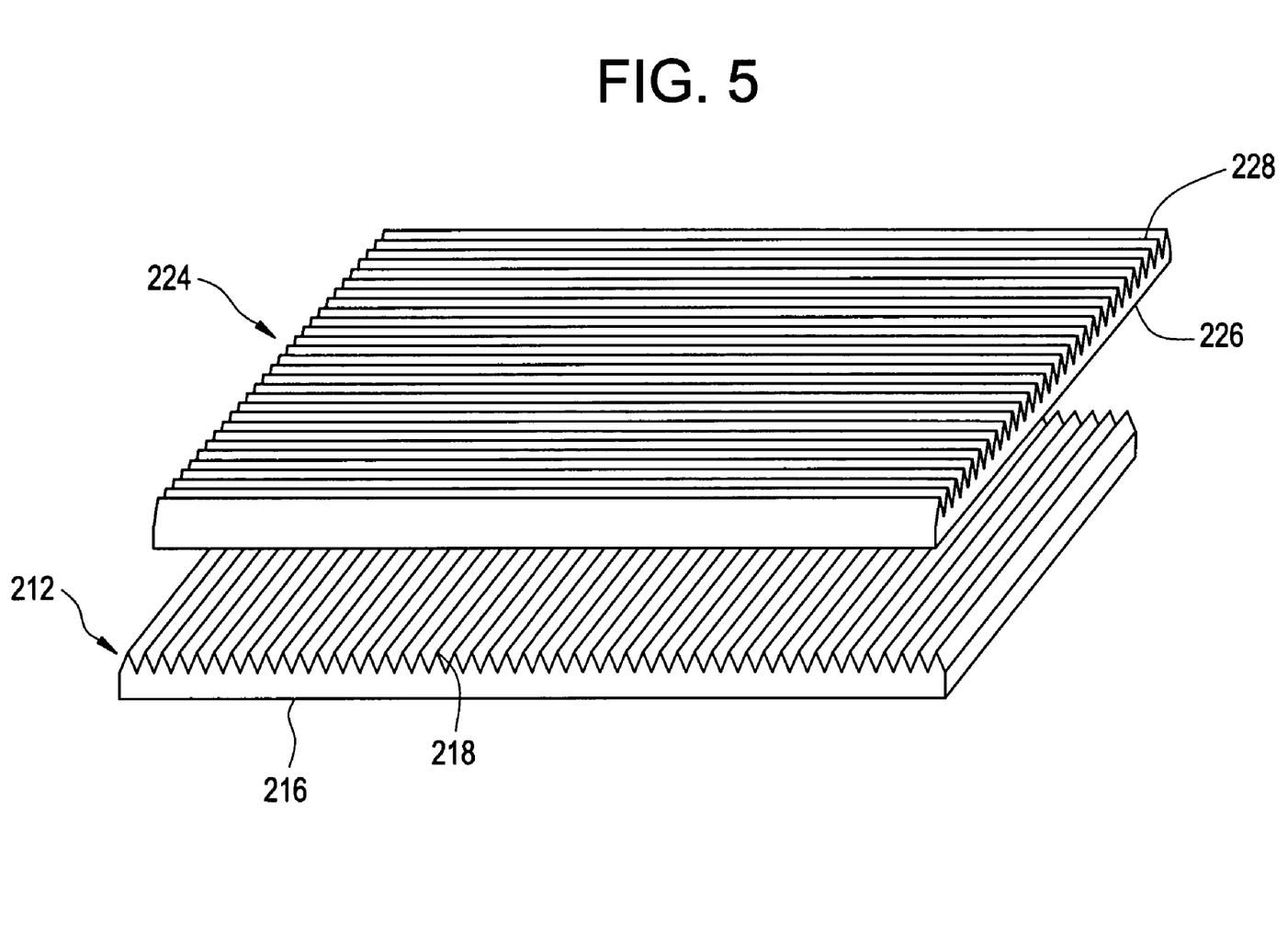
FIG. 5 is a perspective view of an exemplary embodiment of two brightness enhancement films oriented at an angle with respect to each other.

Further, it is noted that in various embodiments a backlight display device may comprise a plurality of brightness enhancement films (BEF) and a plurality of light-diffusing films in optical communication with each other. The plurality of brightness enhancing films and light-diffusing films may be arranged in any configuration to obtain the desired results in the LCD. For example, the brightness enhancement films may be arranged in physical and/or optical communication with each other as illustrated in FIG. 5. More particularly, a first BEF 212 comprises a first BEF planar surface 216 and a first BEF prismatic surface 218. A second BEF 224 comprises a second BEF planar surface 226 and a second BEF prismatic surface 228. The first BEF 212 and the second BEF 224 can be arranged such that the prismatic surfaces (218 and 228, respectively) are positioned at an angle with respect to one another, e.g., 90 degrees.

Additionally, as briefly mentioned above, the arrangement and type of BEFs and light-diffusing films depends on the backlight display device in which they are employed. An increasingly common use of a backlight display device is for use in a notebook computer. While reference is made to a notebook computer throughout this disclosure, it is to be understood that one of skill in the art can readily use the light-diffusing films disclosed herein in other applications without undue experimentation.

Figure 6:
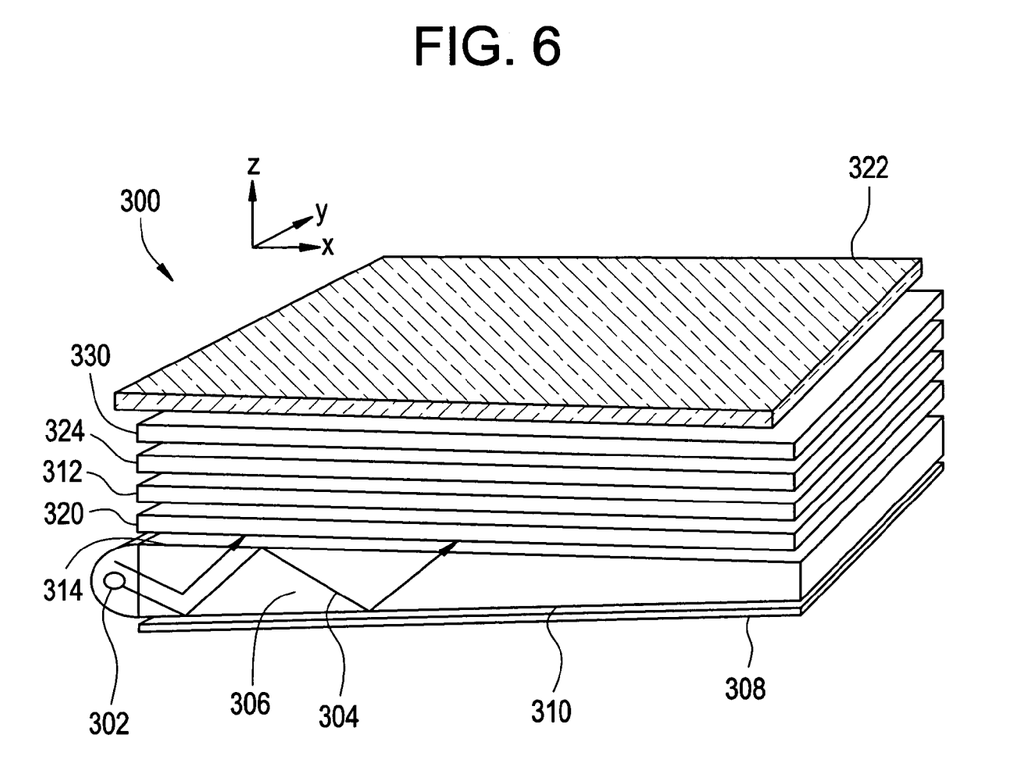
FIG. 6 is a perspective view of an exemplary embodiment of a backlight display device including a plurality of brightness enhancement films and a plurality of light-diffusing films.

A backlight display device 300 for use in a notebook computer is illustrated in FIG. 6. The backlight display device 300 comprises an optical source 302 for generating light 304. A light guide 306 in optical communication with optical source 302 guides the light 304 by total internal reflection of the light 304, as discussed above in relation to FIG. 1. A reflective film 308 in physical and/or optical communication with a first surface 310 of light guide 306 reflects the light 304 out of the light guide 306. A bottom light-diffusing film 320 and a top light-diffusing film 330 are in optical communication with a first BEF 312 and a second BEF 324 disposed between the bottom light-diffusing film 320 and the top-diffusing film 330. The light 304 proceeds from the top light-diffusing film 330 to a liquid crystal display (LCD) 322.

With regard to the embodiment illustrated in FIG. 6, it is noted that the bottom light-diffusing film 320 functions primarily to enhance the uniformity of the light 304 and interacts with the other films (e.g., BEFs 312 and 324) to enhance on-axis luminance possible. Another function of the bottom light-diffusing film 320 is to hide optical imperfections that may be caused by the light guide 306. The top light-diffusing film 330 functions primarily to minimize glare and optical coupling (Newton Rings) between the BEFs (e.g., 312 and 324). In addition, the top light-diffusing film 330 may also function as a protective film for the BEF films (312, 324), thereby reducing the likelihood of fracturing or damaging the prismatic surfaces of the BEF films. Furthermore, it is noted that top light-diffusing films (e.g., 330), i.e., the light-diffusing film nearest to the liquid crystal display (e.g. 322), generally have a haze value of less than or equal to 85%, more particularly a haze value of less than or equal to 50%. Whereas, bottom light-diffusing films (e.g., 320), i.e., the light-diffusing film nearest the light guide (e.g., 306), generally have a haze value of greater than or equal to 90%, more particularly a haze value of greater than or equal to 95%.

It is noted that the percent haze can be predicted and calculated from the following equation:

$$\% \text{ Haze} = 100 \times \frac{\text{Total Diffuse Transmission}}{\text{Total Transmission}} \qquad (1)$$

wherein total transmission is the integrated transmission; and the total diffuse transmission is the light transmission that is scattered by the film as defined by ASTM D 1003.

Optical source (e.g., 102, 302) may include any light source suitable to backlight a liquid crystal display (LCD) device, which includes both high-brightness and low-brightness light sources. The high-brightness light source may include, but is not limited to, a cold cathode fluorescent lamp (CCFL), a fluorescent lamp, and the like. The low-brightness light source may include, but is not limited to, a light emitting diode (LED), and a cold cathode fluorescent lamp.

Light guide (e.g., 106, 306) preferably comprises a material that assumes a low internal absorption of the light, including, but not limited to, an acrylic film and desirably transparent materials including acryl, PMMA (polymethylmethacrylate), polycarbonate, polyethylene, Selenium (Se), Silver Chloride (AgCl), and the like. The shape of the light guide may be in a shape suitable for use, such as a bar, a curved surface, a plate, a sheet, and the like. The light guide may be of a single piece or a lamination of a plurality of sheets.

Reflective film (e.g. 108, 308) may be in any usable shape for reflecting light, e.g., a planar shape, such as a plate, sheet, and the like, wherein the reflective film comprises a reflective material. For example, suitable reflective materials include, but are not limited to, an aluminum deposited film, a silver deposited film, and the like. In other embodiments, the reflective film may comprise a thermoplastic material, e.g., Spectralon® (available from Labsphere, Inc.) or titanium-oxide pigmented Lexan® (available from General Electric Co.).

As noted above, brightness enhancement films (e.g. 112) use prismatic structures to direct light along the viewing axis (i.e., normal to the display), which enhances the brightness of the light viewed by the user of the display and which allows the system to use less power to create a desired level of on-axis illumination. For example, the brightness enhancement film may include those materials discussed in U.S. patent application Ser. No. 20030108701 to Coyle et al. More specifically, the brightness enhancement film may comprise metal, paper, acrylics, polycarbonates, phenolics, cellulose acetate butyrate, cellulose acetate propionate, poly(ether sulfone), poly(methyl methacrylate), polyurethane, polyester, poly(vinylchloride), polyethylene terephthalate, and combinations comprising at least one of the foregoing.

A light-diffusing film (e.g., 120) comprising polycarbonate is capable of being employed in a backlight display device without resulting in waviness of the light-diffusing film as a result of heat from an optical (light) source. Various techniques may be utilized to obtain films with light-diffusing capabilities. For example, physical modifications to the films may result in imprinting a texture to the surface of the film to diffuse light (e.g., textured light-diffusing films). As will be discussed in greater detail, it is desirable to texture both a top and bottom surface of the film. In other embodiments, light-diffusing particles may be imbedded into the film to give the film light-diffusing properties (e.g., bulk light-diffusing films). In yet other embodiments, a combination of both methods may be used, i.e., both imprinting a texture on the surface of the film and imbedding a light-diffusing particle in the film.

In an embodiment, the light-diffusing film comprises polycarbonate, an anti-static material, and optionally, light-diffusing particles. The light-diffusing film comprises greater than or equal to 80 wt. % polycarbonate, and more particularly greater than or equal to 90 wt. % polycarbonate, wherein weight percents are based on total weight of the light-diffusing film. For example, in an embodiment, the light-diffusing film may comprises about 93 wt. % to about 99.6 wt. % polycarbonate; about 0.4 wt. % to about 7 wt. % anti-static material, more specifically, about 0.4 wt. % to about 2 wt. % anti-static material; and optionally up to about 7 wt. % light-diffusing particles, more specifically, about 2 wt. % to 7 wt. %, wherein weight percents are based on total weight of the light-diffusing film. More specifically, the light-diffusing film may include those disclosed in U.S. patent application Ser. No. 10/787,158, which is herein incorporated by reference.

The anti-static material of the light-diffusing film comprises a sufficient anti-static material in an amount sufficient to impart anti-static properties to the film. For example the anti-static material may comprise phosphonium sulfonate. More particularly, in an embodiment, the anti-static material is that described in U.S. Pat. No. 6,194,497 to Henricus et al. More specifically, the phosphonium sulfonate can be a fluorinated phosphonium sulfonate and comprises a fluorocarbon containing an organic sulfonate anion and an organic phosphonium cation. Examples of such organic sulfonate anions include, but are not limited to, perfluoro methane sulfonate, perfluoro butane sulfonate, perfluoro hexane sulfonate, perfluoro heptane sulfonate, and perfluoro octane sulfonate. Examples of the phosphonium cation include, but are not limited to, aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium and aromatic phosphoniums such as tetraphenyl phosphonium, triphenylmethyl phosphonium, triphenylbenzyl phosphonium, tributylbenzyl phosphonium. More specifically, the fluorinated phosphonium sulfonate may be obtained by any combination of any of these organic sulfonate anions and organic cations.

Furthermore, even more specifically, the phosphonium sulfonate employed herein can be a fluorinated phosphonium sulfonate having the general formula:

wherein F is fluorine; n is an integer of from 1-12, S is sulfur; $R_1$, $R_2$, and $R_3$ are the same, each having an aliphatic hydrocarbon radical of 1-8 carbon atoms or an aromatic hydrocarbon radical of 6-12 carbon atoms and $R_4$ is a hydrocarbon radical of 1-18 carbon atoms. Anti-static compositions comprising fluorinated phosphonium sulfonate shown by formula as having the principle component thereof may be used in many different ways to make use of their anti-static and compatibility characteristics and heat resistance in providing such anti-static characteristics to polycarbonate. The phosphonium fluorocarbon sulfonate salts are low melting semi-solid materials, and as such, they may be handled as a molten liquid. Some embodiments are solid crystalline materials at room temperature (i.e., a temperature of about 15° C. to about 25° C.) and are easy to weigh, handle, and add to the polycarbonate.

While the anti-static material may be added to the polycarbonate at any time in the process, it is desirable to add it to the polycarbonate at the time of polymer production. For example, the polycarbonate and anti-static material may be processed by, for example, extrusion, and the like.

Suitable light-diffusing particles of the light-diffusing film comprise organic material(s) that do not significantly adversely affect the physical properties desired in the polycarbonate, for example, impact strength or tensile strength. More particularly, light-diffusing particles can be acrylic based and include poly(acrylates); poly(alkyl methacrylates), for example, poly(methyl methacrylate) (PMMA); and mixtures comprising at least one of the foregoing organic materials, wherein the alkyl groups have one to about twelve carbon atoms. Further, the light-diffusing particles have a sufficient size to impart the desired diffusive characteristic of the light-diffusing film. For example, light-diffusing particles can have a mean particle size (taken along the major diameter (i.e., the longest diameter)) of about 3 micrometers to about 10 micrometers.

It has been discovered that a light-diffusing film comprising polycarbonate stretched by the process disclosed below is capable of producing a light-diffusing film that does not result in waviness of the film from heat produced from an optical (light) source, while maintaining its desired optical transmission properties. In various embodiments, the light-diffusing film may be employed as a top-light diffusing film or as a bottom light-diffusing film. The resulting light-diffusing films have a linear Coefficient of Thermal Expansion (CTE) (measured in a direction parallel to the stretching direction) less than or equal to $50 \times 10^{-6}$ centimeter per centimeter per degree Celsius (cm/cm/° C.), more specifically less than or equal to $35 \times 10^{-6}$ cm/cm/° C., with a linear CTE of about $17 \times 10^{-6}$ cm/cm/° C. to about $35 \times 10^{-6}$ cm/cm/° C. desirable. For comparison, it should be noted that the polycarbonate film disclosed herein has a linear CTE of about $70 \times 10^{-6}$ cm/cm/° C. (measured in the direction of extrusion) prior to stretching.

Figure 7:
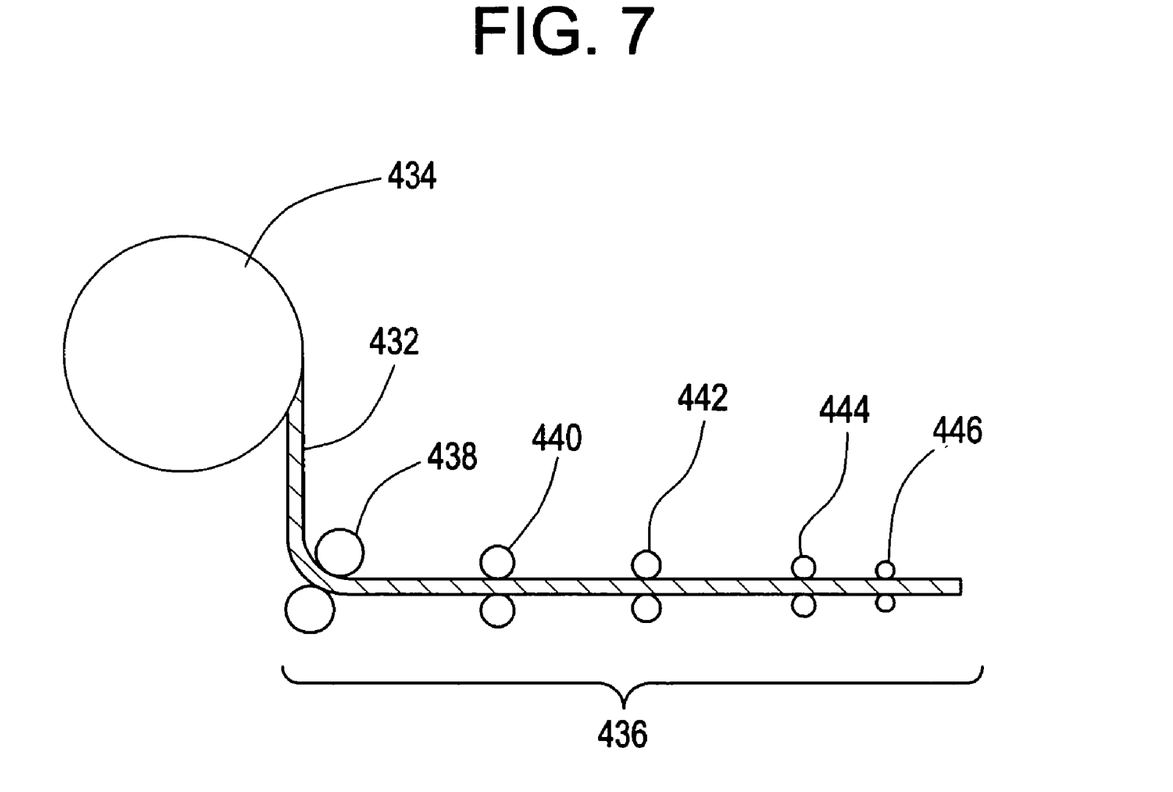
FIG. 7 is a schematic illustration of an exemplary embodiment of a method of stretching a light-diffusing film.

Referring now to FIG. 7, an exemplary process for stretching a light-diffusing film is illustrated. In this embodiment, a light-diffusing film 432 is unwound from a roll 434 comprising the light-diffusing film 432. It is noted that the light-diffusing film in this operation has already been textured on a top and bottom surface of the film and/or light-diffusing particles have already been added to the film to impart its light-diffusing characteristics. Without being bound by theory, it is noted that a textured top and bottom surface of a light diffusing film (e.g., 432) may minimize scratching of the surfaces of the film that may result from the stretching process. Additionally, it is understood that the following stretching method may be readily adapted as part of the production of the light-diffusing film, for example, as a subsequent operation to extruding, and optionally texturing, the light-diffusing film.

In the embodiment illustrated in FIG. 7, the light-diffusing film 432 is directed to a stretching unit 436, such as a machine direction orienter (MDO). The stretching unit 436 comprises pre-heating rolls 438, slow draw rolls 440, fast draw rolls 442, and optionally annealing rolls 444 and cooling rolls 446. While FIG. 7 illustrates a sliding type MDO, other stretching configurations capable of producing a light-diffusing film may be employed, wherein the film does not produce waviness when exposed to heat from a lamp. For example, other stretching configurations include, but are not limited to, a cantilever type MDO, a vertical type MDO, and the like. Furthermore, it is noted that the size of the rollers, material of the rollers, number of rollers, the film wrap around the rollers, and the like may vary with the stretching unit employed.

In operation, the light-diffusing film 432 is unrolled from roll 434 and directed to pre-heating rolls 438 located upstream of slow draw rolls 440. The pre-heating rolls 438 and slow draw rolls 440 are used in sequence to heat the light-diffusing film to a sufficient temperature to soften the light-diffusing film such that it may be stretched without tearing. More particularly, the light-diffusing film is heated to a temperature close to the glass transition temperatures (e.g., a temperature±about 50° F. (about 28° C.) of the glass transition temperature of film, more specifically a temperature±about 25° F. (about 14° C.) of the glass transition temperature of the film). In order to maintain the desired texture of the light-diffusing film, the light diffusing film is desirably heated to a temperature less than or equal to 50° F. (about 28° C.) lower than the glass transition temperature of the light-diffusing film, and specifically less than or equal to 25° F. (about 14° C.) lower than the glass transition temperature of the light-diffusing film. For example, light-diffusing films comprising greater than or equal to 93 wt. % polycarbonate can be heated to a temperature of about 270° F. (about 132° C.) to about 320° F. (about 160° C.), wherein the weight percent is based on the total weight of the light-diffusing film. Generally, the pre-heating rolls 438 are maintained at a lower temperature than the slow-draw rolls 440.

The light diffusing film is then stretched between the slow draw rollers 440 and the fast draw rollers 442. It is noted that the terms "slow" and "fast" used to describe the rollers are used merely for convenience in description. More particularly, these terms are used to illustrate a relative speed of one set of rollers relative to a second set of rollers located down stream of the first set. Generally, in operation, the fast draw rollers 442 accelerate the film causing it to become longer, thinner, and somewhat narrower (necked) compared to the size of the film when passed through the slow draw rollers 440. Further, the degree of orientation (i.e., stretching) of the light-diffusing film is generally described in terms of a stretch ratio, which is the ratio of the surface speed of the fast draw rollers 442 to the surface speed of slow draw rollers 440. More specifically, the stretch ratio is sufficient to produce a light-diffusing film such that waviness in the film is avoided upon exposure to heat from, e.g., a fluorescent lamp. The stretch ratio depends on the desired application of the film, more specifically the desired thickness of the film, e.g., a thickness of about 0.025 mm to about 0.5 mm, more specifically about 0.1 mm to about 0.25 mm. For example, the stretch ratio can be about 1.1 to about 3, and more specifically about 1.4 to about 2. It is noted that a stretch ratio of greater than or equal to 2 may result in scratching of the film.

Furthermore, in various embodiments, the film is desirably textured on both the top and bottom surface of the film to minimize scratching of the surface of the film. For example, the top and/or bottom surfaces may have an average surface roughness (Ra) of greater than or equal to 20 microinches (about 0.5 micrometers), particularly greater than or equal to 40 microinches (about 1.0 micrometers), and more particularly greater than or equal to 60 microinches (about 1.5 micrometers). Surface roughness (Ra) is a term readily understood by those skilled in the art. Generally, the Ra is a measure of the average roughness of the film. It can be determined by integrating the absolute value of the difference between the surface height and the average height and dividing by the measurement length for a one dimensional surface profile, or the measurement area for a two dimensional surface profile.

Located downstream of fast draw rollers 442 are optionally annealing rollers 444 and cooling rollers 446, which operate at progressively lower temperatures. More particularly, the annealing rollers 444 are operated at a higher temperature than the cooling rollers 446, but a lower temperature than the fast draw rollers 442. Further, the cooling rollers 446 operate at a temperature less than the annealing rollers 444. Furthermore, it is noted that the annealing rollers (e.g., 444) and the cooling rollers (446) may improve the room temperature (i.e., a temperature of about 15° C. to about 25° C.) appearance of the film.

EXAMPLES

A roll of polycarbonate film, grade XL4248-112, made using a process similar to that described in U.S. patent application Ser. No. 10/787,158, having a nominal thickness 0.008 inches (about 200 micrometers) manufactured at GE Structured Products, Mt. Vernon, Ind., was employed in these examples. The top surface of the film had an average roughness (Ra), measured using a Surfometer instrument manufactured by Precision Devices, Inc., Milan, Mich., of 60 microinches (about 1.5 micrometers) to 85 microinches (about 2.2 micrometers), the bottom surface had a roughness of 12 microinches (about 0.3 micrometers) to 30 microinches (about 0.8 micrometers). The following settings were used on the Surfometer instrument: cutoff length equaled 0.03 inches (about 0.08 centimeters), Stroke Length equaled 5 cutoffs, Pc Threshold equaled 10 microinches (about 0.3 micrometers), Roughness filter equaled Gaussian. The film had a haze value (measured using a Haze-Gard Plus instrument, available from BYK-Gardner, Md.) of 65% to 80%, and a light transmission value (also measured using a Haze-Gard Plus), of about 90.5%. The film was stretched using a machine direction orientator using the conditions noted below in Table 1.

TABLE 1

| | |
|---|---|
| Preheat temperature | 200° F. (about 93° C.) to 260° F. (about 127° C.); |
| Slow draw temperature | 270° F. (about 132° C.) to 320° F. (about 160° C. |
| Slow Draw speed | 5 feet per minute (ft/min) (about 1.5 meters per minute (m/min)) to 40 ft/min (about 12.2 m/min) |
| Fast Draw temperature | 270° F. (about 132° C.) to 320° F. (about 160° C.); |
| Fast Draw Speed | 8 ft/min (about 2.4 m/min) to 64 ft/min (about 19.5 m/min) |
| Anneal Temperature | 200° F. (about 93° C.) to 260° F. (about 127° C.); |
| Cool temperature | 70° F. (about 21° C.) to 100° F. (about 38° C.). |

At a stretch ratio of 1.6, the film obtained had a nominal thickness of 0.0055 inches (about 140 micrometers), a haze value of about 35%, and a light transmission value of about 90.3%. The linear coefficient of thermal expansion (CTE) (measured in a direction parallel to the stretching direction), which was measured using thermo-mechanical analysis (TMA) with a temperature range of −10° C. to 100° C., and calculated using the slope of a linear fit to the TMA curve between 20° C. and 60° C., was found to be $18.7 \times 10^{-6}$ cm/cm/° C. In comparison, the linear CTE of the unstretched film measured in the direction of extrusion was found to be about $70 \times 10^{-6}$ cm/cm/° C.

The resulting film was assessed for suitability of use as a top diffuser by placing it in a commercial liquid crystal display (model LP121X04 (A2) manufactured by LG Philips) in place of the pre-existing top diffuser film. The luminance at a zero degree view angle (i.e., on-axis) was measured (with the liquid crystal panel removed) using an Eldim EZ Contrast 160D instrument, and found to be 100.3% of the value obtained when a commercial top diffuser, DL4248-112, manufactured by GE Structured Products and described in U.S. patent application Ser. No. 10/787,158, was used. In other words, the luminance was at least 90% of that measured for DL4248-112. Further, the film was compared to a polyethylene terephthalate (PET) film having light diffusing particles coated thereon to impart light diffusing properties to the PET film. More particularly, the film was compared to a D117 top diffuser, commercially available from Tsujiden Co., Ltd. The luminance was found to be 99.5% of the value obtained when the commercial top diffuser, D117, from Tsujiden Co., Ltd. was used.

In another test, the degree of waviness was measured. In this example, at a stretch ratio of 1.8, the film obtained had a nominal thickness of 0.005 inches (approximately 127 microns), a haze value of about 43%, and a light transmission value of about 91%. The degree of waviness was measured using the following method: the existing top diffuser film from a commercial 15 inch (about 38 centimeter) notebook PC backlight module (model AD1511, manufactured by Coretronic Industries, Taiwan) was removed and replaced with the film whose waviness was to be measured. The film was oriented so that the stretching direction was parallel to the long axis of the CCFL. The CCFL of the module was turned on and the system was allowed to equilibrate for a period of 10 minutes. The height of the highest portion of the tallest wave in the top diffuser was measured from a baseline of a point on the BEF film directly below the highest point of the wave, using a rule having a ¹⁄₁₀₀ inch scale The performance was compared with that of a commercial top diffuser, DL4248-112 (thickness 0.005 inches (about 127 micrometers)), available commercially from GE Structured Products, and described in U.S. patent Ser. No. 10/787,158. The height of the largest wave exhibited by the DL4248-112 was measured toe be 0.04 inches (about 1 mm), while the stretched film had a wave height of 0.00 inches, i.e., no waves were observed.

In another test, the physical appearance/quality, e.g., cosmetic quality of the film, was assessed as follows. 16 contiguous samples, each suitable for use in a 17 inch (about 43 centimeter) backlight module were cut from a roll of light-diffusing film made at a stretch ratio of 1.8 by the method described above. Each sample had a length of about 14 inches (about 25 centimeters) and a width of about 10 inches (about 26 centimeters). Each sample was then visually inspected under a fluorescent lamp in a darkened class 10000 clean-room environment and graded, so that a total of about 2235 square inches (about 14,418 square centimeters) was inspected. A grade of "OK" (i.e., acceptable) was obtained if the sample had an average defect size of less than or equal to 0.2 millimeters (measured as the average of the major diameter (length) (longest diameter) of the defect and the minor diameter (length perpendicular to longest length) of the defect) or "NG" (i.e., not acceptable) otherwise. Examples of defects include, but are not limited to, scratches, blemishes, dimples, dents, black specs, brown specs, and texture inconsistencies. Defects were sized using an eye loupe (a hand held magnifying device that has a length measuring scale attached to its end marked in 50 micron increments). Based on the above inspection, a yield was calculated as follows. A grade of "NG" was also assigned to any film that had a scratch having a length greater than or equal to 3 mm. The yield (percent) equaled the number of "OK" samples divided by the total number of samples multiplied by 100. In this test, 3 films were rejected, which equated to a yield of 81%. In other words, in the total observed area of 2235 square inches (about 14,418 square centimeters), at least 13 samples, each having a size of 14 inches (about 35 centimeters) by 10 (about 26 centimeters) inches, may be obtained having no defects and scratches as mentioned above.

Light-diffusing films produced by the above-described process were tested to evaluate their robustness to conditions of elevated temperatures and elevated levels of relative humidity. In one series of tests, a film having a nominal thickness of 140 micrometers was produced using the process conditions outlined in Table 1 and a stretch ratio of 1.5. The linear CTE of the film was measured to be $39.4 \times 10^{-6}$ cm/cm/° C. (measured in a direction parallel to the stretching direction). The light-diffusing film was cut into several rectangular pieces suitable for use in a 15 inch (about 38 centimeter) backlight module. Two such cut films were each placed on a glass plate having a larger width and length than the film. The maximum height of the bottom of any edge of the film above the glass plate (i.e., deviation from flatness) was measured as 0.00 inches, using a rule having a ¹/₁₀₀ inch scale. Each film was then taped to the glass plate at three edges (the two short edges and one of the long edges). One of these (Set A) was placed in a chamber where the temperature was maintained at 65° C. and relative humidity at 95% for a period of 500 hours. The other (Set B) was subjected to a thermal cycling test through being placed in a chamber where the temperature was cycled between 85° C. and −35° C. (minimal moisture content in the air, e.g., less than or equal to 60% relative humidity), with the temperature held at each extreme for 1 hour and then changed to the other extreme at a rate of 20° C. per minute. 100 such cycles were run.

After completion of each test, the set was removed from the chamber and placed at 22° C., 50% relative humidity for 14 days. The tapes were removed from the edges of the film and the maximum deviation from flatness at any edge was measured. For each set, this value was found to be 0.02 inches (about 0.05 centimeters). Additionally, the linear CTE of the film from set B in the stretch direction was measured after the test and found to be $33 \times 10^{-6}$ cm/cm/° C.

In other words, the stretched light-diffusing films disclosed herein are capable of having a maximum deviation from flatness, as measured at an edge when placed on a glass plate of less than or equal to 0.1 inches (about 0.3 centimeters), more specifically less than or equal to 0.05 inches (about 0.1 centimeter), even more specifically less than or equal to 0.02 inches (about 0.05 centimeter). The stretched light-diffusing films are also capable of having a maximum deviation from flatness, as measured after a high heat, high humidity or thermal cycling test as described above of less than or equal to 0.1 inches (about 0.3 centimeters), more specifically less than or equal to 0.05 inches (about 0.1 centimeter), even more specifically less than or equal to 0.03 inches (about 0.08 centimeter). Additionally, the linear CTE of the stretched light-diffusing film (measured in the direction of stretch) is increased less than or equal to $5 \times 10^{-6}$ cm/cm/° C. after a high heat, high humidity test or thermal cycling test as discussed above. Furthermore, the stretched light-diffusing film has an average defect size of less than or equal to 0.2 millimeters, wherein the average defect is a numerical average of a major diameter of the defect and a minor diameter of the defect.

Advantageously, it is noted that the light-diffusing film comprising polycarbonate having been stretched by the method disclosed herein may be used to produce a light-diffusing film that does not produce waviness in the film when exposed to heat from an optical source used in a backlight display device. Since this waviness can render the display device un-usable, a reduction or elimination of this waviness is desirable.

Additionally, the light-diffusing films disclosed herein comprise polycarbonate. It is noted that polycarbonate has a heat deflection temperature (HDT) of about 135° C. as compared to about 70° C. for amorphous polyethylene terephthalate (PET). The HDT is the temperature at which the material starts to bend or deflect. As such, all else being equal, the polycarbonate would tend to be a more structural stable material compared to PET that has traditionally been employed as a light-diffusing film.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A liquid crystal display device comprising:
   an optical source;
   a light guide in optical communication with the optical source; and
   an optical film comprising polycarbonate in optical communication with the light guide, wherein the optical film, without light diffusing particles, has a linear CTE, measured in a direction parallel to a stretching direction of the optical film, of less than or equal to $50 \times 10^{-6}$ cm/cm/° C.

2. The liquid crystal display device of claim 1, wherein the linear CTE is less than or equal to $35 \times 10^{-6}$ cm/cm/° C.

3. The liquid crystal display device of claim 2, wherein the linear CTE is about $17 \times 10^{-6}$ cm/cm/° C. to $35 \times 10^{-6}$ cm/cm/° C.

4. The liquid crystal display device of claim 1, wherein the optical film has a thickness of about 0.025 mm to about 0.5 mm.

5. The liquid crystal display device of claim 4, wherein the thickness is about 0.1 mm to about 0.25 mm.

6. The liquid crystal display device of claim 1, wherein the optical film is a light-diffusing film.

7. The liquid crystal display device of claim 1, wherein the liquid crystal display is a back-light display device.

8. The liquid crystal display device of claim 1, wherein a surface of the optical film has an average surface roughness (Ra) of greater than or equal to 0.5 micrometers.

9. An optical film comprising:
   greater than or equal to 80 wt. % polycarbonate, wherein weight percent is based on a total weight of the optical film, and wherein, without light diffusing particles, the optical film has a linear CTE, measured in a direction parallel to a stretching direction of the optical film, of less than or equal to $50 \times 10^{-6}$ cm/cm/° C.

10. The optical film of claim 9, wherein the linear CTE is less than or equal to $35 \times 10^{-6}$ cm/cm/° C.

11. The optical film of claim 10, wherein the linear CTE is about $17 \times 10^{-6}$ cm/cm/° C. to $35 \times 10^{-6}$ cm/cm/° C.

12. The optical film of claim 9, wherein the optical film is a light diffusing film.

13. The optical film of claim 9, wherein a surface of the optical film has an average surface roughness (Ra) of greater than or equal to 0.5 micrometers.

14. A stretched optical film, comprising:
   anti-static material;
   greater than or equal to 80 wt. % polycarbonate, wherein weight percent is based on a total weight of the stretched optical film; and
   wherein, without light diffusing particles, the stretched optical film has a linear CTE, measured in a direction parallel to a stretching direction of the optical film, of less than or equal to $50 \times 10^{-6}$ cm/cm/° C.

15. The stretched optical film of claim 14, wherein the linear CTE is less than or equal to $35 \times 10^{-6}$ cm/cm/° C.

16. The stretched optical film of claim 15, wherein the linear CTE is about $17 \times 10^{-6}$ cm/cm/° C. to $35 \times 10^{-6}$ cm/cm/° C.

17. The stretched optical film of claim 14, wherein the stretched optical film has a thickness of about 0.025 mm to about 0.5 mm.

18. The stretched optical film of claim 17, wherein the thickness is about 0.1 mm to about 0.25 mm.

19. The stretched optical film of claim 14, wherein the stretched optical film is a light-diffusing film.

20. The stretched optical film of claim 14, wherein a surface of the stretched optical film has an average surface roughness (Ra) of greater than or equal to 0.5 micrometers.

21. A stretched optical film, comprising:
anti-static material;
greater than or equal to 80 wt. % polycarbonate, wherein weight percent is based on a total weight of the stretched optical film;
no light diffusing particles; and
wherein the stretched optical film has a linear CTE, measured in a direction parallel to a stretching direction of the optical film, of less than or equal to $50 \times 10^{-6}$ cm/cm/° C.

22. The stretched optical film of claim 21, wherein the linear CTE is less than or equal to $35 \times 10^{-6}$ cm/cm/° C.

23. The stretched optical film of claim 22, wherein the linear CTE is about $17 \times 10^{-6}$ cm/cm/° C. to $35 \times 10^{-6}$ cm/cm/° C.

* * * * *